(12) United States Patent
Blanford

(10) Patent No.: US 7,546,949 B1
(45) Date of Patent: Jun. 16, 2009

(54) METHODS AND APPARATUS FOR BAR CODE CONVERSION

(75) Inventor: Denis Michael Blanford, Duluth, GA (US)

(73) Assignee: NCR Corporation, Dayton, OH (US)

( * ) Notice: Subject to any disclaimer, the term of this patent is extended or adjusted under 35 U.S.C. 154(b) by 155 days.

(21) Appl. No.: 11/612,548

(22) Filed: Dec. 19, 2006

(51) Int. Cl.
G08C 21/00 (2006.01)

(52) U.S. Cl. .............................. 235/462.07; 235/462.1; 235/375

(58) Field of Classification Search ............ 235/462.07, 235/462.01, 462.81, 462.08, 375, 435
See application file for complete search history.

(56) References Cited

U.S. PATENT DOCUMENTS 4,990,756 A * 2/1991 Hoemann .................. 235/435
6,039,252 A * 3/2000 Maltsev .................. 235/462.27
6,263,383 B1 * 7/2001 Lee et al. ...................... 710/38
2004/0163051 A1 * 8/2004 Hepworth et al. ........... 715/530

* cited by examiner

Primary Examiner—Kumiko C Koyama
Assistant Examiner—Sonji Johnson
(74) Attorney, Agent, or Firm—Priest & Goldstein PLLC; Paul W. Martin

(57) ABSTRACT

Systems and techniques for detecting and decoding bar code data and transferring the data to a host system. A bar code scanner detects and decodes a bar code and passes the bar code information, including bar code format information, to host system. The bar code scanner detects indicia that may appear in a bar code and responds as indicated by the indicia. One of the available responses is to transfer bar code data to a host system in a form consistent with a format indicated by indicia appearing in the bar code, but different from the format in which the bar code actually appears.

3 Claims, 3 Drawing Sheets

200
FIG. 2A
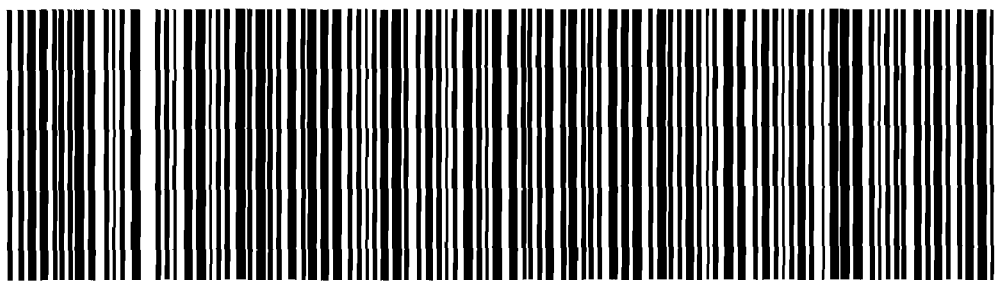
T00443PKJDGYKYB34
250
RSS AI 93
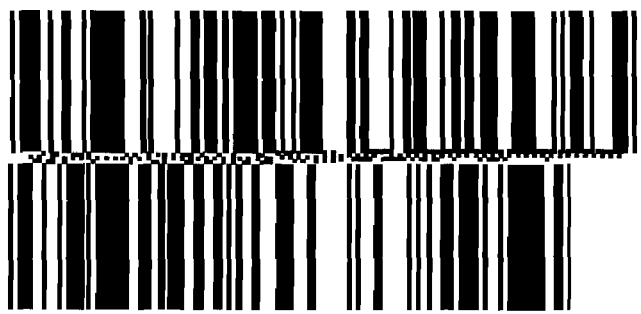
(93)T00443PKJDGYKYB34
FIG. 2B

METHODS AND APPARATUS FOR BAR CODE CONVERSION

FIELD OF THE INVENTION

The present invention relates generally to improvements to bar code recognition and decoding. More specifically, the invention relates to improved systems and techniques for recognizing indicia in a bar code indicating a format recognized by a host system receiving bar code data from a scanner and supplying bar code information from the scanner to the host system in a format indicated by the indicia.

BACKGROUND OF THE INVENTION

Bar code scanning comprises the generation of a scan pattern to illuminate a bar code so as to scatter light from the bar code, to use this scattered light to generate a scan signal, and to process the scan signal to decode the bar code so as to extract encoded information. The encoded information is provided to a host device. Numerous formats are used for bar codes, with a scanner typically identifying the bar code format of a detected bar code to the host device.

An organization implementing a bar code system may sometimes wish to replace the bar codes used for one purpose with bar codes of another format. Organizations, such as retailers, may use a particular bar code format for designated purposes, such as prescriptions or customer loyalty cards. A retailer may be using a nonomnidirectional bar code format, such as Code 39, Code 128, or code interleaved Two of Five, for a designated purpose, and may wish to begin using a more convenient bar code format for that purpose. For example, a retailer may be reading a nonomnidirectional bar code on omnidirectional scanners, and may wish to change to an omnidirectional bar code in order to avoid inefficiencies and difficulties that may accompany reading of nonomnidirectional bar codes on omnidirectional scanners. Such difficulties include poor scan angles provided by the bar codes, or bar code lines too short for efficient reading by omnidirectional scanners.

However, a host system to which bar code information is provided by a scanner, such as a point of sale system, receives and uses bar code format information in order to interpret the bar code. If a new format is introduced for the same purpose, two different formats will be used, and will need to be interpreted by host systems, until all the previously existing bar codes are purged out of the system, for example, until all goods bearing the previously used bar codes are sold or otherwise disposed of, or until all customer loyalty cards bearing the previously used bar codes are replaced. Such purging may take months or years, depending on the uses to which the bar codes are being put, and during that time, the host system will need to accommodate two different formats of bar code, the previously existing format, and the newly introduced format.

SUMMARY OF THE INVENTION

The present invention addresses these problems, as well as others, by using indicia in a bar code that is replacing a previously used bar code of a different format to cause the bar code to be identified to a host system as a bar code in the previous format. Many omnidirectional bar codes, such as reduced space symbology (RSS) bar codes, include a range of available codes that can be given desired meanings by an organization employing the codes. Such codes are sometimes called application identifiers. Each bar code employing a new format can use an application identifier, and a scanner can be programmed to recognize an application identifier appearing in the bar code and to respond to the presence of the application identifier by sending the bar code information to a host system with format information for the previously used bar code. For example, an RSS bar code including an appropriate application identifier might be transmitted to a host system along with a symbology identifier for a Code 39 bar code. A scanner might be programmed with different application identifiers, and might be programmed or reprogrammed to respond to an application identifier in different ways as needed.

A more complete understanding of the present invention, as well as further features and advantages of the invention, will be apparent from the following Detailed Description and the accompanying drawings.

BRIEF DESCRIPTION OF THE DRAWINGS

FIGS. 2A and 2B illustrate exemplary bar codes that may be decoded and interpreted by a scanner according to an aspect of the present invention.

DETAILED DESCRIPTION

Figure 1:
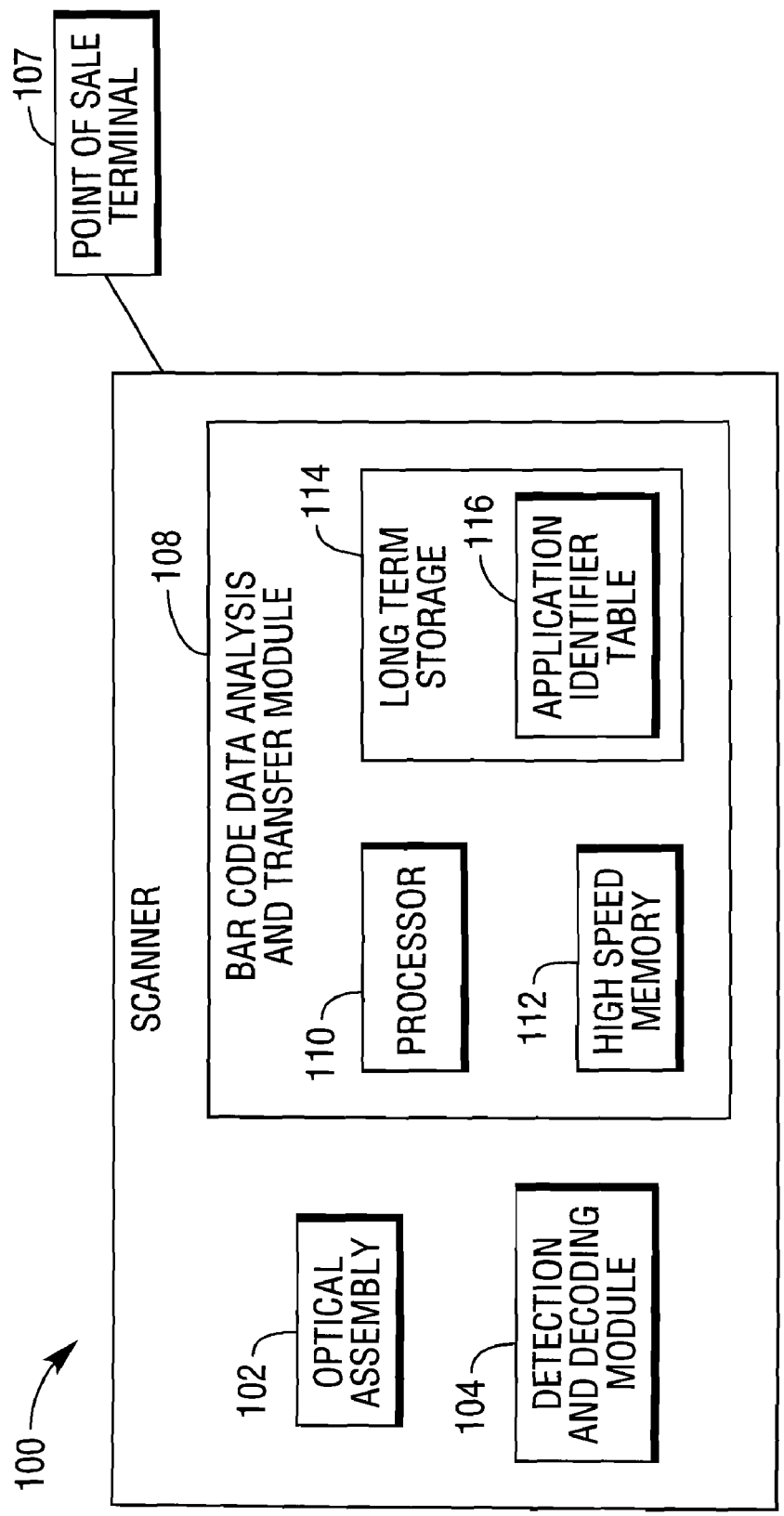
FIG. 1 illustrates an exemplary bar code scanner according to an aspect of the present invention.

FIG. 1 illustrates a scanner 100 according to an aspect of the present invention. The scanner 100 includes an optical assembly 102 for generating a scan pattern and a detection and decoding module 104 for processing light entering the scanner 100 as a result of reflection or scattering of a scan beam emitted from a scan window to strike an object in a scan zone. A single scan window is illustrated here for simplicity, but it will be recognized that the teachings of the present invention may be employed with any number of scanner configurations.

The detection and decoding module 104 generates and processes a scan signal to identify the bar code format and extract bar code information. The bar code information is typically presented to a host device, such as a point of sale terminal 107, and the bar code information is presented to the host device in the format for such bar code data. A user of a bar code format, such as a retailer, may employ different bar code formats for different purposes, and it is possible that some bar codes in different formats will include the same information. By receiving bar code information in the format in which it appears, the host device is able to avoid confusing two bar codes that have the same information but use different formats. For example, an RSS bar code and a Code 39 bar code may happen to include the same information, but when the bar codes are decoded and the data is provided to a host system such as the point of sale terminal 107, the data from the Code 39 bar code is presented as Code 39 data and the data from the RSS bar code is presented as RSS data.

Many bar code formats provide for special indicia used to direct the treatment of the bar code information by the scanner. For example, a bar code format may dedicate a special range of character combinations, such as two digit numbers in specified positions in the bar code, for special use, and a user, such as a retailer, can program a scanner to respond to these combinations in prescribed ways. Such combinations are often referred to as application identifiers. For example, the reduced space symbology (RSS) format provides the codes 91-99 for use by organizations as locally assigned application identifiers, and a scanner such as the scanner 100 may respond as programmed on encountering these codes.

The scanner 100 also includes a bar code data analysis and transfer module 108. The module 108 suitably includes a processor 110, high speed memory 112, and long term memory 114. The bar code data analysis and transfer module 108 receives bar code data from the detection and decoding module 106, performs any needed operations in response to the data, and transfers the data to a host system. One function of the bar code data analysis and transfer module 108 is to convert a bar code to another format, suitably in response to indicia within the bar code, for purposes of converting bar code data from the format of the bar code in which it appears to the format of a bar code already recognized by a host system, such as the terminal 107.

Such conversion can be used to simplify introduction of a new bar coding system by an organization. Organizations may employ nonomnidirectional bar code formats as well as omnidirectional formats, and may use omnidirectional bar code scanners to read both bar code formats. The scanner 100 may suitably be an omnidirectional scanner. Bar codes in a nonomnidirectional format may be used internally by an organization. That is, an organization may define the meanings of bar codes according to its own internal definitions, as compared to bar codes such as universal product codes (UPC) codes, which are standardized for use by many organizations. For example, an organization may use nonomnidirectional bar codes for prescriptions, user loyalty identification cards, and the like. If an organization has an existing base of nonomnidirectional bar codes, but wishes to replace these bar codes with omnidirectional bar codes, or for some other reason wishes to replace one bar code format with another, steps must be taken to assure that both bar code formats can be properly read by a scanner, such as the scanner 100. In addition, the bar code information must be properly interpreted by a host system, such as a point of sale terminal, used with a scanner encountering both formats of bar codes, such as the scanner 100. In order to avoid a requirement to adapt the terminal 107, or another host system used with the scanner 100, the module 108 may suitably be programmed to respond appropriately to conversion indicia included in the new bar codes.

FIGS. 2A and 2B are exemplary bar codes suitable for use with a bar code scanner such as the scanner 100 of FIG. 1. FIG. 2A illustrates a bar code 200 in Code 39 format, and FIG. 2B illustrates a bar code 250 in RSS format. The bar code 200 is illustrative of a bar code currently in use, for example, by a retailer. The bar code 200 and other Code 39 bar codes may be used for special purposes defined by the retailer. For example, in the present exemplary case, the bar code 200 may appear on a customer identification card and other similar Code 39 bar codes may be used on customer loyalty identification cards. Numerous other alternatives are possible, such as the use of Code 39 or other nonomnidirectional bar codes for products, such as prescriptions filled at a pharmacy, with the bar codes being associated with particular items by the retailer.

In the present exemplary case, a retailer has employed Code 39 bar codes for customer loyalty identification cards, and also employs omnidirectional bar codes for other purposes, so that the retailer uses omnidirectional scanners to read all of its bar codes. Nonomnidirectional bar codes, such as Code 39 bar codes, can be read using omnidirectional scanners, but various characteristics of such nonomnidirectional bar codes may lead to a lower scanning efficiency or a higher error or read failure rate on omnidirectional scanner, particularly in contrast to omnidirectional bar codes.

Therefore, suppose that the retailer wishes to replace nonomnidirectional bar codes, such as the Code 39 bar code 200, with a particular format of omnidirectional bar codes. In the present exemplary case, the newly introduced format is RSS, of which the bar code 250 is an example. It would be difficult to remove the presently existing customer loyalty cards bearing Code 39 bar codes from use without significantly inconveniencing customers. Similarly, if numerous bar codes belonging to the format that is to be replaced have already been affixed to goods being offered for sale, it would be costly and inconvenient to remove and replace all of the previously used bar codes. Therefore, the scanner 100 may suitably be programmed to have the ability to read a both a replacement bar code, such as the bar code 250 in RSS format, while retaining the ability to read bar codes in the format being replaced, such as the bar code 200 in Code 39 format. Typically, a scanner identifies a bar code format and transfers bar code data to a host device in that format. A host device is programmed at installation to receive and use data from various bar code formats, and to use format identification information in determining how to use bar code information. For example, two different bar codes in different formats may include the same bar code information. When a bar code is scanned, the scanner detects and decodes the bar code, identifies the bar code format, and transfers the bar code information to a host system in a way consistent with the bar code format. For example, when the Code 39 bar code 200 is scanned, the bar code data is transferred to a host system in the form of Code 39 data.

In order to allow for an easy introduction of bar codes in a replacement bar code format, such as RSS bar codes similar to the bar code 250, all such replacement bar codes suitably include indicia indicating how bar code data extracted from the bar codes is to be used by the scanner 100. In the present example, the bar code 250 includes the application identifier 93. When bar codes in the new format, such as the bar code 250, are introduced, the scanner 100 is programmed to recognize the bar codes and to appropriately process data. As noted above, the bar code format standard for RSS bar codes reserves the character sequences 91-99 as application identifiers that may be assigned by an organization for use as defined by that organization. That is, if a two-digit number from 91 to 99 appears in the position in an RSS bar code occupied by the number 93 in the bar code 250, the number will be treated as an application identifier and used to direct the scanner 100 to select and perform specified functions. When a scanner such as the scanner 100 reads the bar code 250, it interprets the application identifier 93 and responds in a predetermined way.

Returning now to FIG. 1, the module 108 receives bar code data, including conversion indicia such as the application identifier 93 appearing in the bar code 250, and operates as indicated by the conversion indicia in transferring bar code data to the terminal 107. In the exemplary case discussed here, the previously used bar code format is a Code 39 format exemplified by the bar code 200 and the new format is a reduced space symbology (RSS) format exemplified by the bar code 250. When the scanner 100 reads an RSS bar code including the application identifier 93, such as the bar code 250, the module 108 may transfers the bar code data to the terminal 107 as Code 39 format data. The terminal 107 therefore responds to the data from the RSS bar code label as if the data came from a Code 39 bar code label. The scanner 100 is able to read the data from a new omnidirectional code and the terminal 107 is able to use the data without any need to update the programming or configuration of the terminal 107. If a Code 39 format bar code label is used, the scanner 100 simply decodes the label and transfers the data to the terminal 107.

In order to interpret the application identifier 93 and other application identifiers that may appear in a bar code, the module 108 employs an application identifier table 116, suitably stored in the long term memory 114. Each application identifier that may appear in the bar code is stored in the table 116, in association instructions for responding to the application identifier. For example, the application identifier 93 in an RSS bar code may indicate that the bar code data is to be furnished to the terminal 107 as Code 39 bar code data, but that the application identifier itself is to be removed. Thus, the bar code data from the bar code 250 will appear to the terminal as identical to the bar code data from the bar code 200.

Numerous other choices are possible, and different application identifiers may be used to produce different results. For example, a bar code similar to the bar code 250, but bearing the application identifier 92 might be used. The application identifier 92 may be associated with appropriate programming in the table 116 to convert the bar code data to Code 39 format, and to include the application identifier itself in the data transferred to the terminal 107. The programming stored in the table 116 may comprise a set of programming bits, with various bits controlling various aspects of the response to the presence of the application identifier. For example, one bit could control whether or not to remove the application identifier from the transferred bar code data, a combination of a few bits could identify the bar code format of the bar code in which an identifier appears, and another combination of a few bits could identify the bar code format in which the data is to be transferred to the terminal 107.

In an alternative implementation, each application identifier available for use with a bar code format could be associated in the table 116 with a single bit programming code, which enables or disables the use of the application identifier. If the bit is set to enable the application identifier, the module 108 transfers the data to the terminal 107 in a specified format associated with the application identifier. If the bit is set to disable the application identifier, the module 108 transfers the data to the terminal 107 in the actual bar code format of the bar code. When a scanner such as the scanner 100 is programmed to read a new format designed to replace a previous format of which examples may still be in use, the table 116 may suitably be established to allow for recognition of application identifiers that will suitably be included in bar codes of the new format, and the module 108 may suitably be programmed to respond to instructions stored in the table 116. There is no need to revise any programming of the terminal 107, or other point of sale terminals or host systems that may be used with scanners such as the scanner 107, because data from the new bar code format will appear to the host systems as if it were in the previously existing format.

For example, in decoding the bar code 250, the module 108 of the scanner 100 would examine the table 116 for the application identifier 93, and would respond according to instructions associated with the application identifier 93 in the table 116. As noted above, the module 108 would respond to the application identifier 93 by removing the application identifier itself, and send the actual bar code data to the terminal 107 in Code 39 format. In this way, a scanner reading the bar codes 200 or 250 could send the same data to a host system in response to a bar code, allowing the host system to respond to both bar codes in the same way without any need to adapt the host system.

Figure 3:
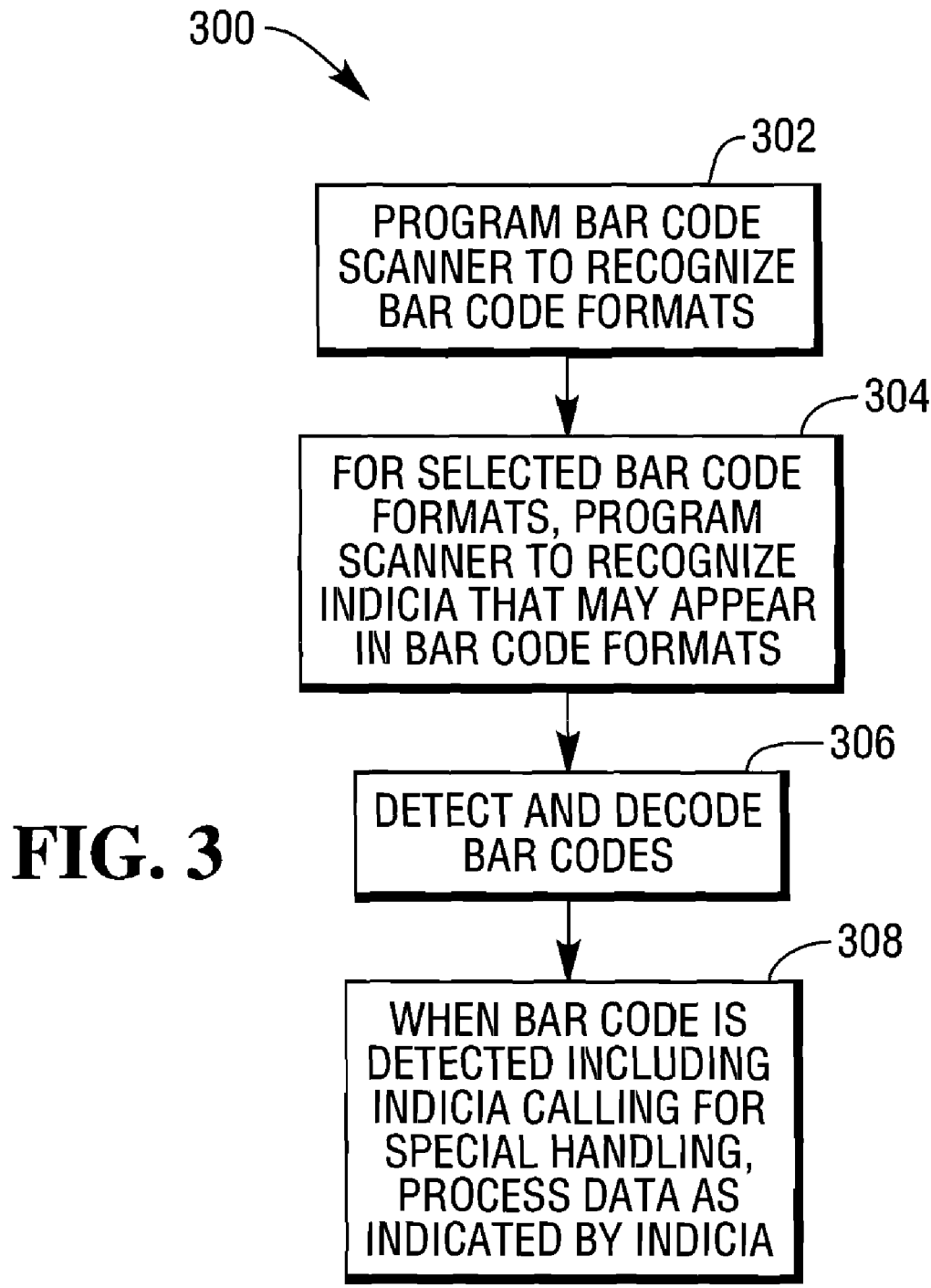
FIG. 3 illustrates a process of bar code decoding and information transfer according to an aspect of the present invention.

FIG. 3 illustrates a process of bar code detection and decoding according to an aspect of the present invention. At step 302, a bar code scanner is programmed to recognize a plurality of bar code formats and to transfer data represented by the bar codes to a host system. Once programmed to recognize a bar code format, the scanner will typically identify the format of a bar code when transferring bar code data to a host system. At step 304, for selected bar code formats, the scanner is programmed to recognize indicia that may appear in bar codes in the selected formats and to respond appropriately to the indicia. Indicia may include special codes such as application identifiers, and response to the appearance of indicia may include converting bar code data to a format indicated by the indicia before transferring the data to a host system. For example, a scanner reading an RSS bar code may convert the bar code date to Code 39 format if an appropriate application identifier appears in the bar code. Various application identifiers may be associated with various responses, such as retaining or removing the application identifier itself before transferring the data to a host system.

At step 306, bar codes are detected and decoded, with bar code data being transferred to a host system as each bar code is detected and decoded. At step 308, when a bar code includes indicia calling for special handling, the bar code data is processed as indicated by the indicia before transferring the data to a host system. For example, a bar code may include an application identifier indicating that the bar code data is to be converted to a different format than the actual format of the bar code before transfer.

While the present invention is disclosed in the context of aspects of presently preferred embodiments, it will be recognized that a wide variety of implementations may be employed by persons of ordinary skill in the art consistent with the above discussion and the claims which follow below.

I claim:

1. A bar code scanner, comprising:

a detection and decoding module for analyzing light scattered from a bar code to extract characters represented by the bar code; and a bar code data analysis module for identifying a format of the bar code and transferring bar code information and format identification information to a host system, the bar code data analysis module being operative to identify indicia that appears in the bar code and respond as indicated by the indicia;

wherein the bar code data analysis module is programmed with a plurality of possible responses associated with a plurality of possible indicia and wherein programming of the bar code data analysis module includes associating application identifiers with a set of programming bits, the values of combinations of one or more bits in the set of programming bits indicating choices of options for responses to the application identifiers;

wherein the possible responses include passing the bar code information to the host system with or without the components comprising the indicia, as indicated by the indicia; and wherein one possible response indicated by the indicia is to identify the format of the bar code to the host system as a format indicated by the indicia and different from an actual format of the bar code.

2. A bar code scanner, comprising:

a detection and decoding module for analyzing light scattered from a bar code to extract characters represented by the bar code; and a bar code data analysis module for identifying a format of a detected bar code and transferring bar code information and format identification information to a host system, the bar code data analysis module being operative to identify indicia that may appear in a bar code and respond as indicated by the indicia;

wherein programming of the bar code data analysis module includes associating each identifier with a single bit programming code, the value of the single bit programming code indicating whether the use of the application identifier is to be enabled or disabled, enabling of use of the application identifier causing the bar code data analysis module to transfer the bar code information to the host system in a format associated with the application identifier and disabling of use of the application identifier causing the bar code data analysis module to transfer the bar code information to the host system in a bar code format of the bar code as read;

wherein possible responses include passing the bar code information to the host system with or without the components comprising the indicia, as indicated by the indicia; and wherein one possible response is to identify the format of the bar code to the host system as a format indicated by the indicia and different from an actual format of the bar code.

3. A method of bar code detection and decoding, comprising the steps of:

analyzing light directed into a bar code scanner from a bar code to decode characters represented by the bar code;

analyzing bar code information for specified indicia;

transferring the bar code information and bar code format identification information to a host system, transferring of the bar code information and bar code format identification information including performing actions indicated by any specified indicia appearing in the bar code, possible actions to be performed including identifying a bar code format indicated by the indicia but different from an actual format of the bar code;

creating programming specifying indicia that may appear in particular bar code formats and directing the actions to be performed upon detection of the indicia, wherein the creating of programming specifying the indicia accompanies creation of programming identifying a new bar code format to be recognized, the new bar code format including specified indicia;

wherein the indicia include application identifiers indicating special handling for the bar code;

wherein the application identifiers are codes reserved for local use by an organization in a bar code definition and wherein one or more of the application indicia is associated with programming causing the transfer of the bar code information to the host system in a format indicated by the application identifier but different from the format of the bar code in which the application identifier appears;

wherein the creation of programming specifying the indicia includes associating one or more application identifiers with a single bit programming code, the value of a programming code indicating whether the use of the application identifier is to be enabled or disabled, enabling of use of the application identifier causing the bar code data analysis module to transfer bar code information to a host system in a format associated with the application identifier and disabling of use of the application identifier causing the bar code data analysis module to transfer the bar code information to the host system in a format of the bar code as read.

* * * * *